A. FESCA.

CENTRIFUGAL MACHINES FOR DRAINING SUGAR, &c.

No. 7,455. Reissued Jan. 2, 1877.

Witnesses:

Edwd. C. Payson

Geo. H. Miatt

Inventor:

Albert Fesca

Per Edw. E. Quimby atty.

UNITED STATES PATENT OFFICE.

ALBERT FESCA, OF BERLIN, PRUSSIA.

IMPROVEMENT IN CENTRIFUGAL MACHINES FOR DRAINING SUGAR, &c.

Specification forming part of Letters Patent No. 125,036, dated March 26, 1872; reissue No. 7,455, dated January 2, 1877; application filed November 15, 1876.

*To all whom it may concern:*

Be it known that I, ALBERT FESCA, of Berlin, Prussia, have invented a certain Improvement in Centrifugal Machines for Drying Sugar, &c., of which the following is a specification:

The object of my invention is twofold—first, to provide for the independent action, in a centrifugal machine, of each one of a series of counterbalance-weights; and, secondly, to facilitate the operation of the weights in rapidly adjusting themselves to the different positions which they may be required to assume.

While it is desirable that the counterbalance-weights shall be sufficiently sensitive in their action to respond quickly to the forces acting upon them, it is essential that a certain amount of friction shall be exerted upon them, for the purpose of arresting their momentum when they have received a sudden impulse tending to throw them too far in one direction.

In my apparatus I provide for the application of the required amount of friction to each weight separately. My invention, therefore, has two features. It consists, first, in a series of horizontal tables or disks, arranged at short intervals, one above the other, within the hollow chamber or cone of a centrifugal machine, for the purpose of separating each one of a like series of counterbalance-weights, and separately administering to each of the said weights the desired amount of friction. The second feature of my invention consists in the use of weights in the form of rings, which have an easy rolling motion in adjusting themselves in obedience to the centrifugal forces generated by the revolution of the machine.

Figure 1:
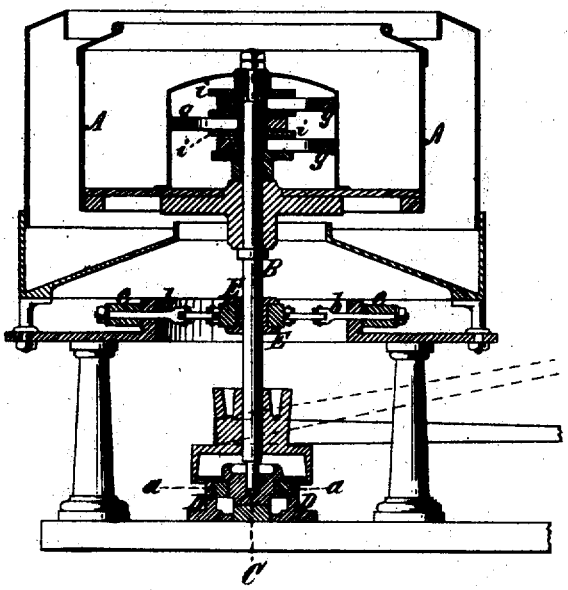
Figure 2:
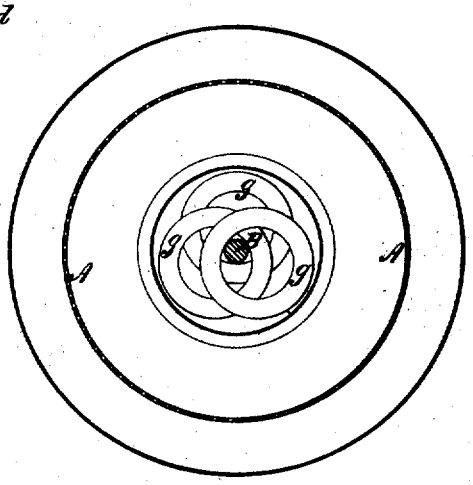
Figure 4:
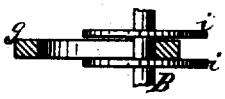
Figure 5:
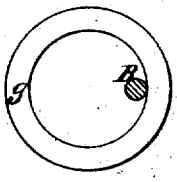

The accompanying drawings are as follows: Figure 1 is a central vertical section of a centrifugal machine provided with my improved independent counter-balances. Fig. 2 is a transverse section. Figs. 3, 4, 5, and 6 represent parts of the machine in detail.

The drawings represent a centrifugal machine provided with the usual perforated basket A, mounted on a vertical spindle, B, to which a rapid revolving motion is imparted by a belt or any other suitable means. The spindle is stepped in a block, C, which is centralized by means of the india-rubber blocks *a a* within the circular box D. The upper bearing of the spindle is in the box E, which is also centralized by springs *c*. As will be seen in Fig. 1, radially-arranged bolts *b b* are linked to the box E, and are strained radially outward by means of the india-rubber springs *c c*.

Figure 3:
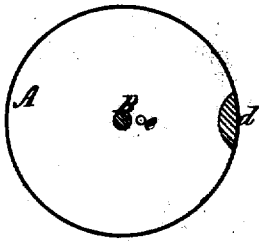

The principle of action of this class of machines is as follows: When the basket or drum of the machine is unevenly charged, centrifugal force, acting upon the local overcharge, exerts a radially-outward pull upon the spindle, in the direction of that part of the drum containing the excess of the material. The spring-bearings of the spindle yield in the direction of the pull, and the spindle, therefore, sways outward, and, as the machine revolves, moves bodily in a circle, the diameter of which is limited by the tension of the springs affixed to its bearings. This is illustrated in Fig. 3, whereon *d* indicates the position of the excess of material in the basket, B the normal axis of the revolving basket, and *e* the point to which the spindle is pulled outward by the centrifugal force of the excess of material *d*. The distance between the center of the spindle B and the point *e* indicates the increase of the radius due to the action of centrifugal force upon the overcharge *d*. The overcharge *d* is, relatively to the basket, stationary. Under these circumstances, if a movable weight is deposited in the centrifugal machine, it tends to assume a position diametrically opposite to the position of the overcharge.

The attempt has been heretofore made to counterbalance the centrifugal force of the overcharge *d* by hanging radially-swinging arms upon the spindle, which were designed to act as drags upon the spindle, tending to pull it in a direction opposite to the pull of the overcharge *d*. These arms, however, rested one upon the other, and were therefore, to a great extent, incapable of independent action.

Figure 6:
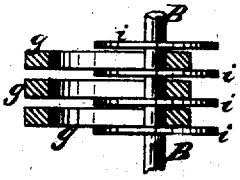

In my improvement the weights, being in the form of rings *g*, are caught on the inside by the spindle as they are thrown outward by centrifugal action. So long as the spindle remains out of the perpendicular and moves bodily in a circle, as has been described, it pulls on the rings, and tends to swing them behind it. The centrifugal force of the rings is thus exerted in a direction contrary to the force exerted by the overcharge *d*, and if the weight of the ring corresponds to the weight of the overcharge, the spindle is gradually brought into a perpendicular position, where it revolves upon its geometrical axis. As, however, the amount of the overcharge in the basket is an uncertain quantity, I provide a series of counterbalance-rings capable of action independently of each other. When the basket is empty, or when it is evenly charged, the rings, in obedience to the forces generated by the revolution of the machine, arrange themselves in equidistant parts of a circle, as shown in Fig. 2. In this position, they may be said to be in mutual centrifugal balance. If all the rings should assume the same radial position, as shown in Fig. 6, they would exert their combined centrifugal effect upon the spindle of the machine, in the same radial direction; but if the combined weight of the rings is greater than the weight of the overcharge, the rings cannot assume this position, but will vary their positions from that shown in Fig. 2, according to the quantity and the location of the overcharge of material in the basket which is required to be counterbalanced. The sensitiveness of action of the rings arises from the fact that they are always free to roll upon the spindle in swinging themselves around into the positions they are required to occupy to balance the machine. Whenever the machine is set in motion the rings will adjust themselves quickly, so as to balance any one-sided overcharge of the basket, or, if there is no overcharge, will readily find the position shown in Fig. 2, where they balance each other. By means of the balance-rings, the spindle is rapidly brought into, and securely held in, a vertical position, and the motion of the machine is rendered smooth and steady.

The several disks *i i* afford, respectively, independent supports for the respective rings, and at the same time produce a certain amount of friction, which opposes the motion of the rings, and thereby prevents them from flying beyond the point of equilibrium when they receive a sudden impulse, and facilitates their assumption of the positions they are required to occupy to maintain the centrifugal balance of the machine. It will therefore be seen that the disks *i i* are simply devices for performing the double function of exerting a certain amount of friction upon the rings, severally, and of separating the rings from each other, to enable the rings to act independently of each other—in other words, to enable each ring to swing into its proper position without having its motion affected by, and without affecting the motion of, another ring, possibly tending to swing into some different position.

I claim as my own invention, and desire to secure by Letters Patent—

1. The combination of one or more loose rings, *g g*, with a spindle, B, of a centrifugal machine, substantially as shown and described.

2. A series of two or more rings, *g g*, hung upon the spindle B of a centrifugal machine, substantially as shown, in combination with devices for affording independent support, and separately administering a certain amount of friction to each one of the rings composing the said series.

ALBERT FESCA.

Witnesses:
HERMANN KREISMANN,
SILAS G. PRATT.